Oct. 27, 1953

J. JARVIS 2,657,348

NULL SEEKING SYSTEM

Filed April 16, 1951

2 Sheets-Sheet 1

INVENTOR.
JOHN JARVIS
BY
*S. H. Hartz*
ATTORNEY

Oct. 27, 1953  J. JARVIS  2,657,348
NULL SEEKING SYSTEM
Filed April 16, 1951  2 Sheets-Sheet 2

INVENTOR.
JOHN JARVIS
BY
ATTORNEY

UNITED STATES PATENT OFFICE 2,657,348

NULL SEEKING SYSTEM

John Jarvis, Dumont, N. J., assignor to Bendix Aviation Corporation, Teterboro, N. J., a corporation of Delaware Application April 16, 1951, Serial No. 221,212

2 Claims. (Cl. 318—28)

The invention relates to electrical systems, and more particularly to null seeking systems in which an alternating current signal is developed by the system and is balanced by another signal in the system.

The invention is especially adapted for use with servo systems in which driving means responds to an alternating current signal and drives a follow-up device to a position to nullify the signal.

In null seeking systems using signal generators which produce alternating current signals, it is impractical to phase the command signal and the follow-up signal exactly 180 degrees apart so that the signals completely cancel one another when the system is at null. In practice, the command signal and the follow-up signal are out of phase with one another, usually not more than 15 degrees, and when the system is at null, a signal component results 90 degrees out of phase with one of the signals.

In a servo system having a motor responsive to the output of a magnetic amplifier controlled by a phase discriminator, the 90 degree signal component partly saturates the cores of the magnetic amplifier and causes overheating with resulting loss of power and poor control characteristics.

The main object of the present invention is to provide a null seeking system which includes means for balancing the 90 degree signal component caused by out of phase signals.

Another object is to provide a null seeking system in which the signal voltages are effectively cancelled when the system is at null.

The invention contemplates a null seeking system for comparing a plurality of voltages from sources having different phase characteristics, whereby a 90 degree signal component develops in the system, including means responsive to the 90 degree signal component and providing a voltage equal in amplitude and opposite in phase to the 90 degree signal component.

The foregoing and other objects and advantages of the invention will appear more fully hereinafter from a consideration of the detailed description which follows, taken together with the accompanying drawings wherein three embodiments of the invention are illustrated. It is to be expressly understood, however, that the drawings are for the purposes of illustration and description only, and are not to be construed as defining the limits of the invention.

Figure 1:
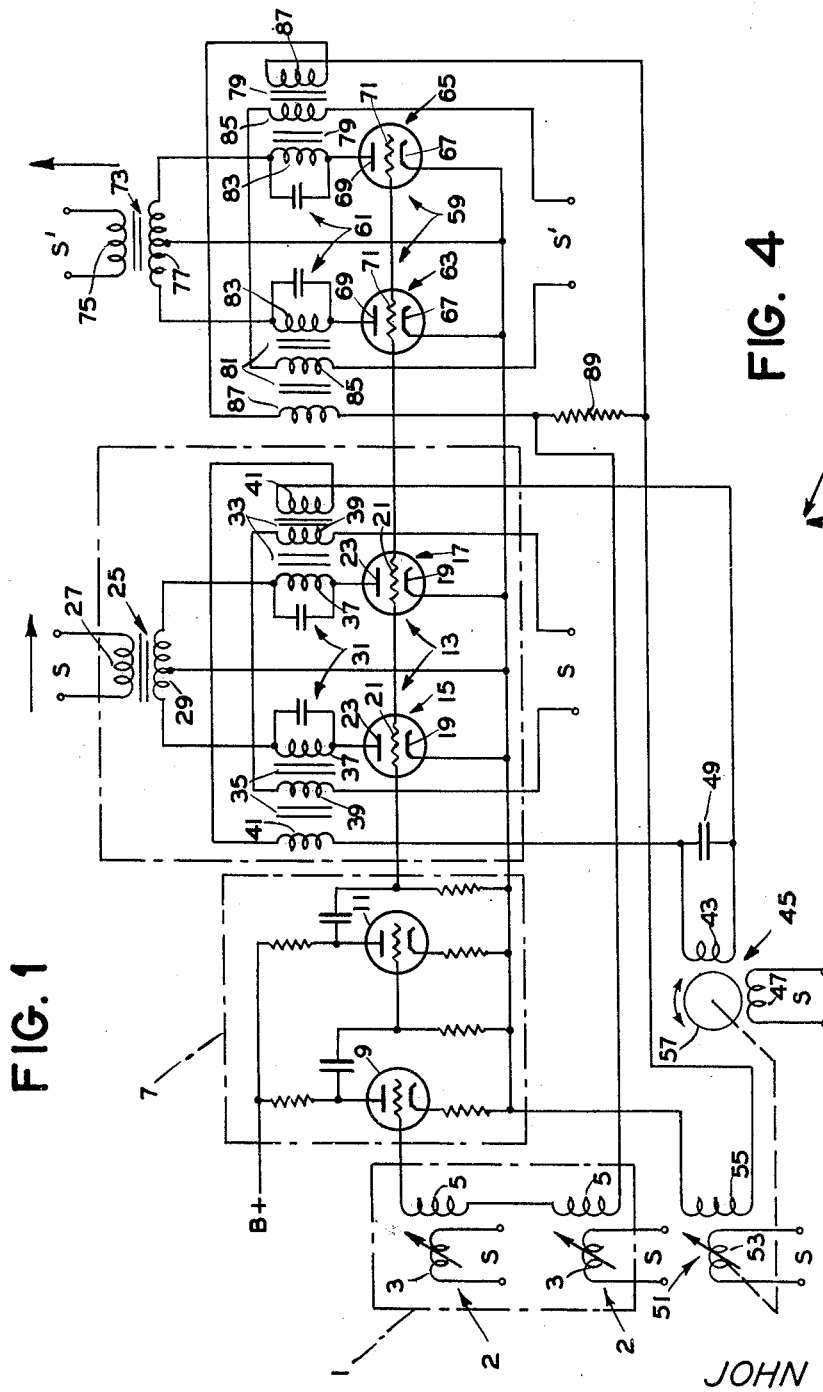
Figure 4:
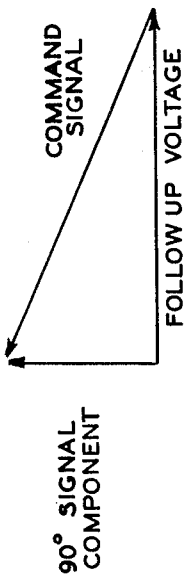
Figure 2:
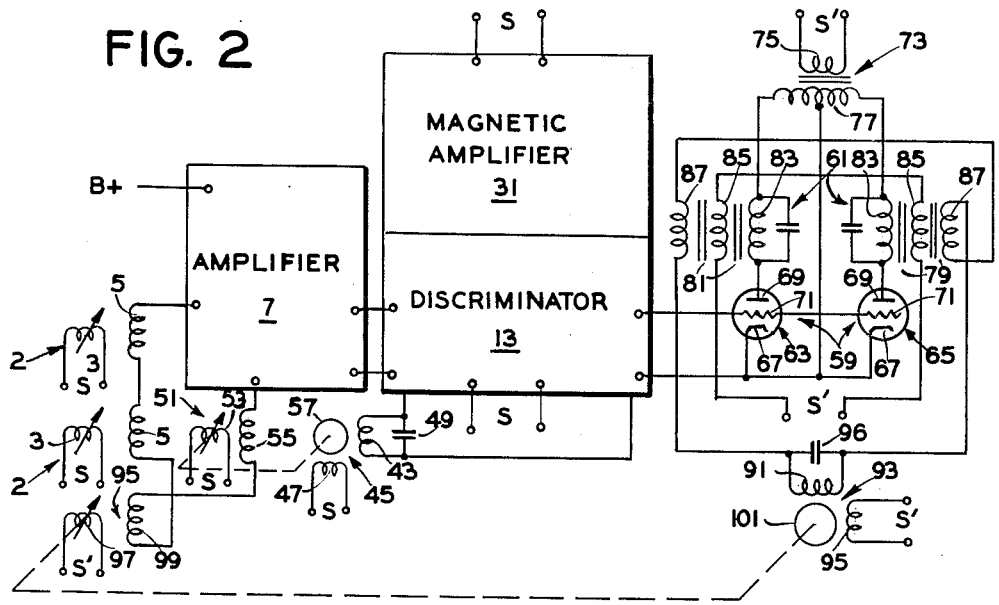
Figure 3:
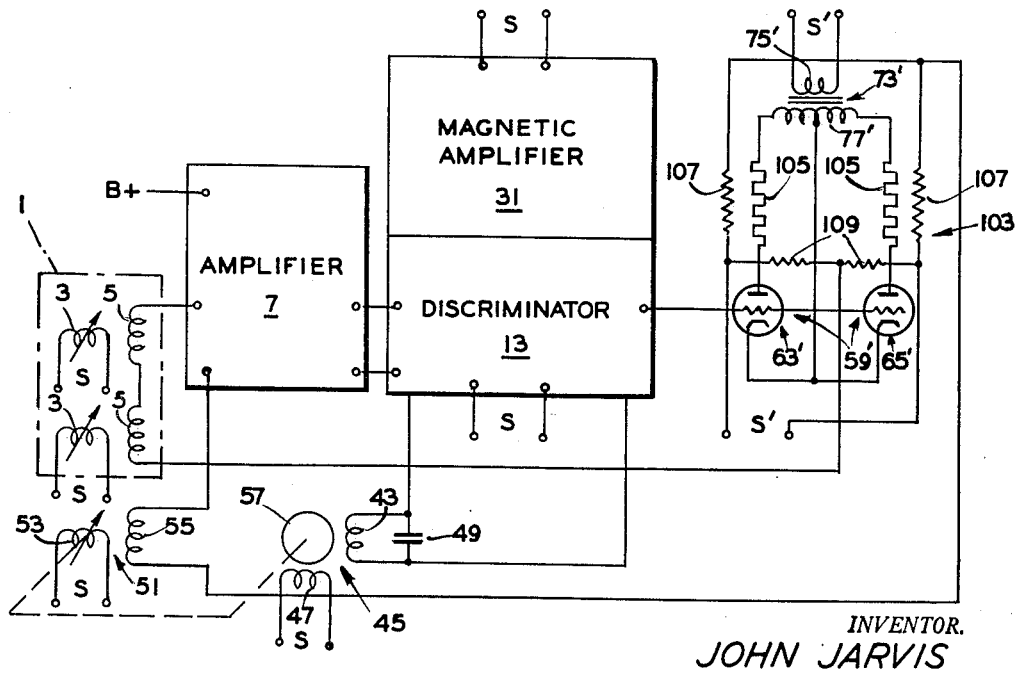

In the drawings, Figure 1 is a schematic wiring diagram showing the invention applied to a servo system;

Figures 2 and 3 are schematic wiring diagrams showing modifications of the system of Figure 1; and Figure 4 is a diagram showing the phase relationship of the command signal and follow-up voltage and resulting 90 degree signal component.

Referring now to the drawings for a more detailed description of the novel null seeking system of the present invention, the system is shown in Figure 1 as incorporated in a servo system and includes a command signal generator 1 comprising one or more inductive devices 2, each responsive to a condition, such as altitude, craft attitude, etc. Each inductive device has a rotor winding 3 energized by an alternating current source S and a startor winding 5 inductively coupled to the associated rotor winding and connected in series with one another. An alternating current signal is developed in the stator of each inductive device upon rotation of the rotor relative to the stator with a change in the condition to which the signal generator is responsive. The phase and amplitude of the signal is determined by the displacement of the rotor relative to the stator.

The signals from the several devices are added algebraically and the sum of the signals is applied to an amplifier 7 having two stages 9, 11. The amplified signal is applied to a phase discriminator 13 including a pair of electron tubes 15, 17, each having a cathode 19, a control grid 21 and a plate 23. A transformer 25 has a primary winding 27 connected across alternating current source S and a center-tapped secondary winding 29 connected in the plate circuits of tubes 15, 17.

A magnetic amplifier 31 has a pair of separate core members 33, 35 each having wound thereon a control winding 37, an exciting winding 39 and a secondary winding 41. Control windings 37 are connected in the plate circuits of tubes 15, 17 in series with secondary winding 29 of transformer 25. Primary windings 39 are connected in series aiding relation with one another to alternating current source S and secondary windings 41 are connected in series opposition with one another to the variable phase winding 43 of a reversible two-phase motor 45 having its fixed phase 47 energized by alternating current source S. A phasing condenser 49 is connected across variable phase winding 43.

A follow-up inductive device 51 has a rotor winding 53 energized by alternating current source S and a stator winding 55 inductively coupled to rotor winding 53. Rotor winding 53 is drivably connected to rotor 57 of motor 45. Stator winding 55 of inductive device 51 is connected in series with stator windings 5 of inductive devices 2. The arrangement described is well known in the art and operates as follows:

When rotor winding 3 is displaced angularly relative to the associated stator winding 5, a signal develops and the signal is amplified by amplifier 7. The phase of the signal is determined by the direction of rotation of the rotor winding relative to the stator winding. The amplified signal is applied to discriminator 13 and either tube 15 or tube 17 conducts since the signal is in phase with the plate potential of one of the tubes and 180 degrees out of phase with the plate potential of the other tube. This provides for current flow through one of the control windings 37 of magnetic amplifier 31 to saturate the associated core and reduce the voltage induced in the secondary winding by current flow in the primary winding. Current flow in the primary winding on the other core continues to induce a voltage in the associated secondary winding and energizes the variable phase winding 43 of motor 45 to drive the rotor winding 53 of follow-up inductive device 51 to a position to nullify the signal from signal generator 1.

Usually, the phase characteristics of inductive devices 2 of signal generator 1 and of follow-up inductive device 51 are not uniform so that a small phase shift occurs between the command signal and the follow-up voltage, as shown in Figure 4. This results in a voltage component 90 degrees out of phase with the follow-up voltage when the discriminator is phased to the follow-up inductive device. This 90 degree signal component causes equal current flow in the plate circuits of both tubes 15, 17 of discriminator 13 and both control windings 37 are energized and equally saturate the associated cores 33, 35 so that motor 45 is unaffected by the 90 degree signal component. Cores 33, 35 of magnetic amplifier 31 are heated considerably because of the saturation and the transformer becomes relatively inefficient.

The present invention includes means for balancing the 90 degree signal component and uses a discriminator 59 and magnetic amplifier 61 corresponding to discriminator 13 and magnetic amplifier 31, respectively. The discriminator includes a pair of electron tubes 63, 65, each having a cathode 67, an anode 69 and a grid 71 connected to the output of amplifier 7. A transformer 73 has a primary winding 75 connected across an alternating current source S' 90 degrees out of phase with alternating current source S and a center-tapped secondary winding 77 connected in the plate circuits of tubes 63, 65.

Magnetic amplifier 61 has a pair of separate cores 79, 81, each having wound thereon a control winding 83, a primary winding 85 and a secondary winding 87. Control windings 83 are connected in the plate circuits of tubes 63, 65 in series with secondary winding 77 of transformer 73. Primary windings 85 are connected in series aiding relation with one another to alternating current source S' and secondary windings 87 are connected in series opposition with one another and to a resistor 89. Resistor 89 is connected in series with stator winding 55 of follow-up inductive device 51 and with stator windings 5 of inductive devices 2. Tube 63 or 65 of discriminator 59 passes current as determined by the phase of the 90 degree signal component (whether in phase or of opposite phase with the plate voltage) and a voltage equal in magnitude to the 90 degree signal component and of opposite phase appears across resistor 89 and balances the 90 degree signal component. This avoids heating of magnetic amplifier 31. It will be apparent that discriminator 59 and magnetic amplifier 61 are of small power capacity as compared to discriminator 13 and magnetic amplifier 31, respectively, since discriminator 59 and magnetic amplifier 61 provide only a voltage across resistor 89, whereas the output of discriminator 13 and magnetic amplifier 31 drives servo motor 45.

The arrangement shown in Figure 2 is substantially the same as the arrangement shown in Figure 1 except that resistor 89 is replaced with a variable phase winding 91 of a reversible two-phase induction motor 93 having its fixed phase 95 energized by alternating current source S'. A phasing condenser 96 is connected across variable phase winding 91.

An inductive device 95 has a single phase rotor winding 97 connected across alternating current source S' and a single phase stator winding 99 inductively coupled to rotor winding 97 and connected in series with stator winding 55 of follow-up-device 51 and with stator windings 5 of inductive devices 2. Rotor 97 is connected mechanically to rotor 101 of motor 93. Motor 93 is energized by the output of discriminator 59 in response to the 90 degree signal component and drives rotor 97 of inductive device 95 to a position to balance the 90 degree signal component.

The arrangement shown in Figure 3 is substantially the same as the arrangement shown in Figure 1 except that the output of discriminator 59' is applied directly to a time delay device 103 of the kind shown in Patent No. 2,463,805 issued March 8, 1949 to William R. Polye and James R. Peek and assigned to the same assignee as the present invention. Time delay device 103 preferably has a short time constant and has a pair of heater windings 105 connected in the plate circuits of discriminator tubes 63', 65' and in series with secondary winding 77' of transformer 73'. Primary winding 75' of transformer 73' is connected to alternating current source S'. One or the other heater winding 105 is energized when tube 63' or 65' passes current in response to the 90 degree signal component. A resistor 107 is closely associated with each heater winding 105 and changes resistance as it is heated by the heater. Resistors 107 form two legs of a bridge circuit and registors 109 form the other two legs of the bridge circuit. Alternating current source S' is connected to the bridge circuit between resistors 107, 109 and the bridge circuit is connected between resistors 107 and between resistors 109 in series with stator windings 5 of inductive devices 2 and stator winding 55 of follow-up device 51. When one or the other tube 63', 65' passes current, the associated heater winding 105 changes the resistance of the associated resistor 107 and the bridge circuit is unbalanced and provides a voltage equal in magnitude to the 90 degree signal component and of opposite phase.

While the invention has been described in connection with a servo system, it is to be understood that the invention is adapted for use with any null seeking system in which voltages from several sources having different phase characteristics are compared, and in which a 90 degree signal component develops. The system described effectively balances the 90 degree signal component caused by the out of phase signals.

Although but three embodiments of the invention have been illustrated and described in detail, it is to be expressly understood that the invention is not limited thereto. Various changes can be made in the design and arrangement of the parts without departing from the spirit and scope of the invention as the same will now be understood by those skilled in the art.

What is claimed is:

1. A servo system of the class described comprising an alternating current signal generator responsive to a condition, a discriminator energized by a reference voltage and connected to said signal generator for determining the phase of the signal relative to the reference voltage, a magnetic amplifier connected to said discriminator and responsive to the output of said discriminator and adapted to provide a voltage corresponding to the phase of the signal relative to the reference voltage, a motor connected to said magnetic amplifier and responsive to the voltage from said magnetic amplifier, a follow-up drivably connected to said motor and connected to said signal generator to nullify the signal therefrom and having phasing characteristics differing from the signal genenator, whereby a 90 degree signal component develops in the system, and means responsive to the 90 degree signal component and providing a voltage equal thereto and 180 degrees out of phase therewith to nullify the 90 degree signal component and avoid heating of said magnetic amplifier.

2. A servo system of the class described comprising an alternating current signal generator responsive to a condition, a discriminator energized by a reference voltage and connected to said signal generator for determining the phase of the signal relative to the reference voltage, a magnetic amplifier connected to said discriminator and responsive to the output of said discriminator and adapted to provide a voltage corresponding to the phase of the signal relative to the reference voltage, a motor connected to said magnetic amplifier and responsive to the voltage from said magnetic amplifier, a follow-up drivably connected to said motor and connected to said signal generator to nullify the signal therefrom and having phasing characteristics differing from the signal generator, whereby a 90 degree signal component develops in the system, a second discriminator connected to said signal generator and responsive to the signal and energized by a second reference voltage 90 degrees out of phase with the first reference voltage for determining the phase of the signal relative to the second reference voltage, and means connected to said second discriminator and adapted to produce a voltage corresponding to the phase of the 90 degree signal component relative to the second reference voltage for nullifying the 90 degree signal component to avoid heating of each magnetic amplifier.

JOHN JARVIS.

References Cited in the file of this patent
UNITED STATES PATENTS

| Number | Name | Date |
|---|---|---|
| 2,440,200 | Jofeh | Apr. 20, 1948 |